(12) United States Patent
Patel et al.

(10) Patent No.: US 8,539,362 B2
(45) Date of Patent: *Sep. 17, 2013

(54) METHOD AND SYSTEM FOR INSERTING ADVERTISEMENTS IN UNIFIED MESSAGING SOLUTIONS

(75) Inventors: Labhesh Patel, San Francisco, CA (US); Shmuel Shaffer, Palo Alto, CA (US); Alan Gatzke, Bainbridge Island, WA (US); Mukul Jain, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/328,128

(22) Filed: Dec. 16, 2011

(65) Prior Publication Data

US 2012/0089463 A1     Apr. 12, 2012

Related U.S. Application Data

(63) Continuation of application No. 11/411,391, filed on Apr. 26, 2006, now Pat. No. 8,082,510.

(51) Int. Cl.
*G06F 3/00*       (2006.01)
*G06F 15/16*      (2006.01)

(52) U.S. Cl.
USPC ........... 715/752; 715/753; 715/765; 709/204; 704/221; 704/231; 705/37; 705/14.4; 705/14.49; 707/736; 707/752; 707/758

(58) Field of Classification Search
USPC .......... 715/751, 752, 753, 733, 738, 741, 715/743, 764, 765, 205; 704/221, 231; 705/14.4, 14.49, 37; 707/706, 759, 769, 707/758, 752, 776, 783, 781; 709/203, 204
See application file for complete search history.

(56) References Cited

U.S. PATENT DOCUMENTS

| | | | |
|---|---|---|---|
| 6,928,149 B1 | 8/2005 | Panjwani et al. | |
| 8,209,185 B2* | 6/2012 | Claudatos et al. | 704/275 |
| 8,239,197 B2* | 8/2012 | Webb et al. | 704/235 |
| 2002/0161697 A1 | 10/2002 | Stephens et al. | |
| 2003/0016656 A1 | 1/2003 | Schwartz | |
| 2003/0123622 A1 | 7/2003 | Gifford et al. | |
| 2004/0168120 A1 | 8/2004 | Scopes | |
| 2005/0278426 A1 | 12/2005 | Blagg | |
| 2007/0117541 A1 | 5/2007 | Helferich | |
| 2007/0153989 A1 | 7/2007 | Howell et al. | |

(Continued)

OTHER PUBLICATIONS

Beau Crawford, "Gmail: A New Breed of Email", CS 5761 Final Project, May 7, 2004, 13 pages.

*Primary Examiner* — Xiomar L Bautista
(74) *Attorney, Agent, or Firm* — Fish & Richardson P.C.

(57) ABSTRACT

A method and an apparatus for inserting an included message into an e-mail message, wherein the e-mail message is transferred through a unified messaging solution have been provided. In one embodiment, the unified messaging solution detects transmission of a voice mail message as the e-mail attachment. The voice mail message is received by a system that facilitates the transfer of the e-mail message. The system associates the included message with the voice mail message. The included message is inserted into the e-mail message. The system sends the e-mail message along with the included message and the attached voice mail message to an intended user. In a preferred embodiment, the included message is an advertising message.

23 Claims, 6 Drawing Sheets

(56) References Cited

U.S. PATENT DOCUMENTS

| | | |
|---|---|---|
| 2008/0126476 A1 | 5/2008 | Nicholas et al. |
| 2008/0275873 A1 | 11/2008 | Bosarge et al. |
| 2008/0288600 A1 | 11/2008 | Clark |
| 2009/0275315 A1 | 11/2009 | Alston |
| 2010/0076843 A1 | 3/2010 | Ashton |

* cited by examiner

METHOD AND SYSTEM FOR INSERTING ADVERTISEMENTS IN UNIFIED MESSAGING SOLUTIONS

CROSS-REFERENCE TO RELATED APPLICATIONS

This application is a continuation application of and claims priority to U.S. application Ser. No. 11/411,391, filed on Apr. 26, 2006, the entire contents of which are incorporated herein by reference.

BACKGROUND OF THE INVENTION

1. Field of Invention

Embodiments of the present invention relate, in general, to the field of online advertising, and, more specifically, to methods and systems for inserting advertisements in e-mail messages, which are transferred through unified messaging solutions.

2. Description of the Background Art

Various means of communication like Electronic Mail (e-mail), voice mail, Short Message Service (SMS), and facsimile are used for fast communication. In these means of communication a one-way message is typically sent. Although some communication means, such as "chat," allow two-way exchange of messages in real time or near real time. A message can include text, audio or image information. A messaging solution is a means of communication that facilitates transfer of a particular type of message. For example, an e-mail can be used to transfer text messages. A unified messaging solution incorporates the various means of communication and facilitates transfer of all types of messages. The advent of faster means of communication provides various companies with business opportunities. Conventionally, companies are using these means of communication for advertising purposes.

In one such conventional technique of advertising, advertising messages are attached to an e-mail message. An advertising server parses the e-mail message to recognize the keywords and language patterns in the e-mail message. Using these keywords and language patterns, the advertising server selects some relevant advertising messages that are related to the content of the e-mail message. The relevant advertising messages are then attached to the e-mail message. Accordingly, a receiver of the e-mail message is presented with the relevant advertising messages while viewing the e-mail message. The unified messaging solutions facilitate the sending of a voice mail message as an e-mail attachment. However, in conventional techniques, the advertising server cannot parse the content of the voice mail message. Therefore, a relevant advertising message cannot be attached to or inserted into the e-mail message to which the voice mail message is attached.

DETAILED DESCRIPTION OF EMBODIMENTS OF THE INVENTION

Various embodiments of the invention provide methods, systems, and computer-readable media for inserting an included message, such as an advertising message, into an e-mail message, wherein the e-mail message is transferred through a unified messaging solution. In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A unified messaging solution facilitates a sending user to send a voice mail message. The voice mail message is sent as an attachment to an e-mail message. The sent voice mail message is received by a system that has a speech-recognition system and an advertising server. The speech-recognition system parses the content of the voice mail message and identifies certain keywords and language patterns in the content of the voice mail message. Based on the identified keywords and language patterns, the advertising server associates an advertising message, which is related to the content of the voice mail message. The advertising message is inserted into the e-mail message. The advertising server sends the e-mail message along with the advertising message and the attached voice mail message to a receiving user.

Figure 1:
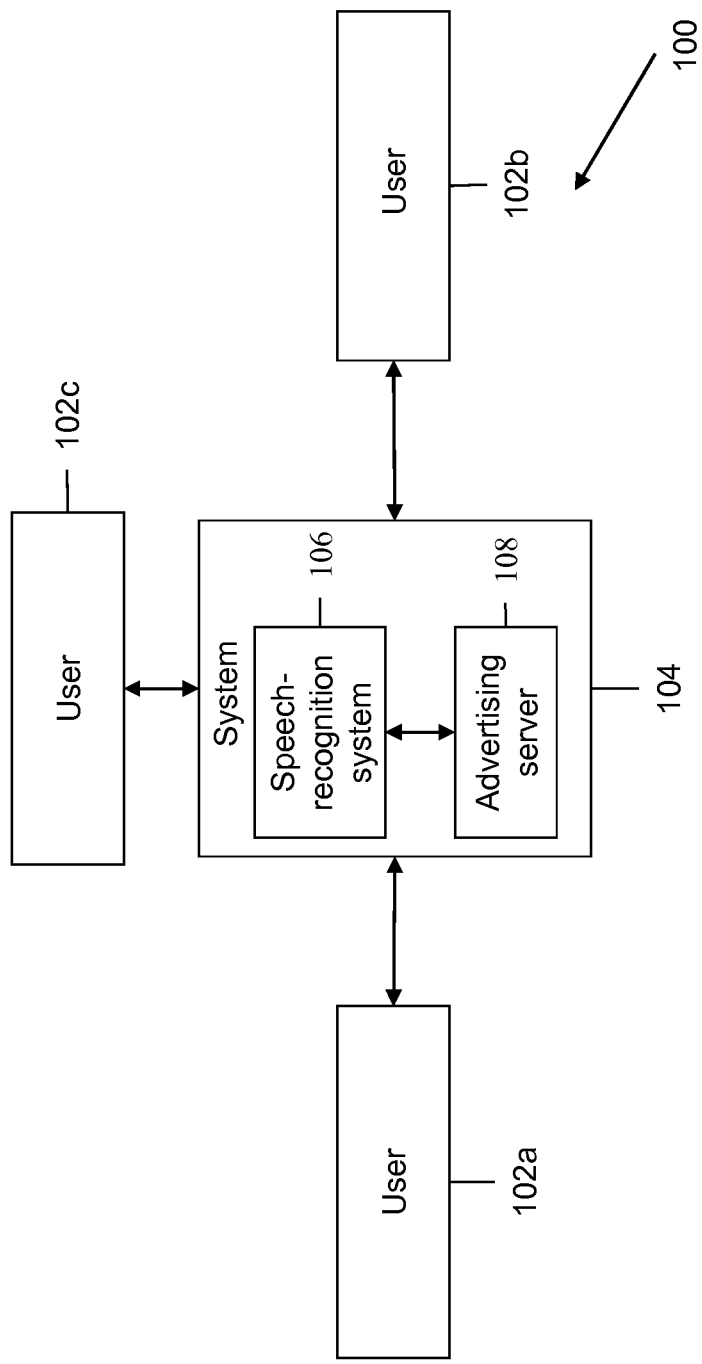
FIG. 1 illustrates an environment for practicing embodiments of the present invention.

Referring now to the drawings, more specifically by their reference numbers, FIG. 1 illustrates an environment for practicing embodiments of the present invention. Environment 100 includes plurality of users 102 and system 104 that facilitates the transfer of an e-mail message through a unified messaging solution. A messaging solution enables communication by facilitating transfer of, for example, a text file, an audio file, a visual file or a combination thereof, using a communication medium. Examples of communication media include Electronic Mail (e-mail), facsimile, Short Message Service (SMS), voice mail, etc. A unified messaging solution is an integration of different communication media so that users 102 can retrieve and send voice, fax, and e-mail messages from a single interface. Examples of interface include wire-line phone, wireless phone, PC, Internet-enabled PC, etc. The unified messaging solution delivers every e-mail, voice, and fax messages to a single inbox and facilitates the transfer of a voice mail message as an e-mail attachment.

A hosted unified messaging solution is provided by a unified messaging solution service hosting company. The hosting company provides the hosted unified messaging solution to users 102 on a rent or lease basis. Examples of hosted unified messaging solutions include those manufactured and distributed by, e.g., Cisco Technologies, Inc., Toshiba, Atinav, etc.

In accordance with an embodiment of the present invention, user 102*a* from plurality of users 102, herein referred to as a sending user, sends a voice mail message. The voice mail message is received by system 104 that facilitates the transfer of the voice mail message as an attachment to an e-mail message. The e-mail message with the attached voice mail message is transmitted to user 102*b* from plurality of users 102, herein referred to as a receiving user.

System 104 also inserts an advertising message into the e-mail message. The advertising message is inserted as text or an image, included as the e-mail attachment, provided as hyperlinked information, or included in any other suitable way. For the purpose of inserting the advertising message into the e-mail message, system 104 includes a speech-recognition system 106 and an advertising server 108. In accordance with an embodiment of the present invention, speech-recognition system 106 is included within advertising server 108. In accordance with another embodiment of the present invention, speech-recognition system 106 is attached to a network and communicates with advertising server 108 through an interface using a proprietary protocol or any other suitable standard, like Media Resource Control Protocol (MRCP). Speech-recognition system 106 recognizes the content of the voice mail message. The recognition of the content of the voice mail message does not depend on the speaker of the voice mail message, therefore, is speaker independent. Moreover, speech-recognition system 106 includes a large vocabulary for identifying keywords and language patterns present in the content of the voice mail message. Examples of companies providing speech-recognition system 106 include Nuance, SpeechWorks, IBM, and so forth. Speech-recognition system 106 parses the content of the voice mail message. Accordingly, speech-recognition system 106 identifies keywords and language patterns in the content of the voice mail message. In accordance with an embodiment of the present invention, speech-recognition system 106 utilizes various speech-recognition technologies. Examples of speech-recognition technologies include Voice Extensible Markup Language (VXML), Natural Speech Recognition, Adaptive Speech Recognition (ASR), and other suitable speech-recognition technologies. The identified keywords and language patterns are then sent to advertising server 108. In accordance with an embodiment of the present invention, speech-recognition system 106 identifies only the keywords in the content of the voice mail message. In accordance with another embodiment of the present invention, speech-recognition system 106 identifies only the language patterns in the content of the voice mail message.

In accordance with an embodiment of the present invention, the keywords identified by speech-recognition system 106 are predefined. Accordingly, speech-recognition system 106 determines whether such predefined keywords occur in the content of the voice mail message. In accordance with another embodiment of the present invention, speech-recognition system 106 identifies keywords, words that occur most frequently in the content of the voice mail message. For example, speech-recognition system 106 may identify keywords and phrases like "vacation", "Baseball", "dinner in San Francisco", and so forth, in the content of the voice mail message.

Advertising server 108 associates an advertising message with the voice mail message. The content of the associated advertising message is related to the identified keywords and language patterns. Advertising server 108 inserts the advertising message into the e-mail message to which the voice mail message is attached. In accordance with an embodiment of the present invention, system 104 associates the voice mail message to an audio-visual file. The audio content of the audio-visual file includes the voice mail message. Moreover, the visual content of the audio-visual file includes a video clip carrying the advertising message. In accordance with an embodiment of the present invention, the video clip does not have any audio content associated to it. In accordance with an embodiment of the present invention, the length of the video clip matches the length of the voice mail message. The e-mail message, along with the attached voice mail message and the advertising message is then transmitted to the receiving user.

Figure 2:
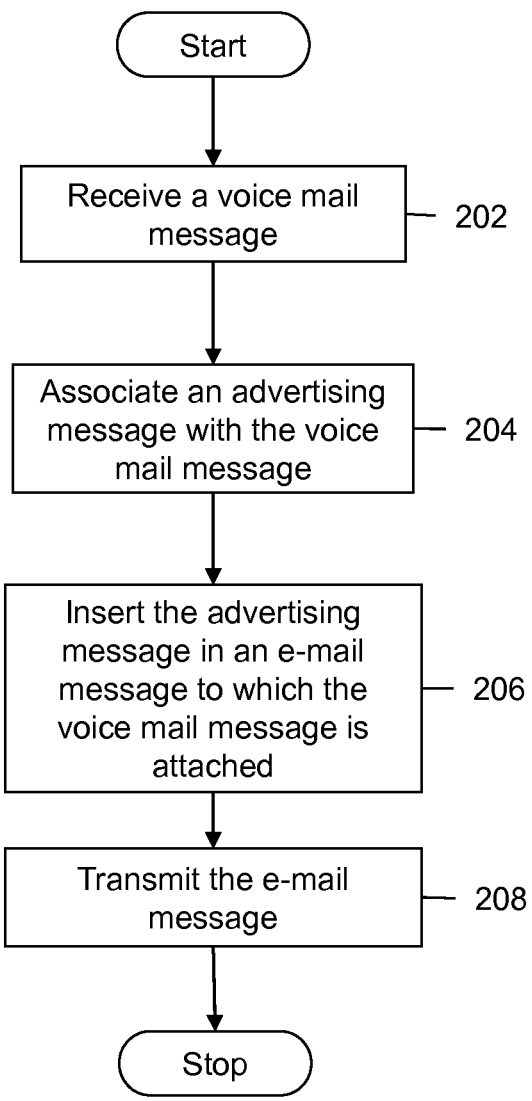
FIG. 2 is a flowchart illustrating a method for inserting an advertising message into an e-mail message, wherein the e-mail message is transferred through a unified messaging solution, in accordance with an embodiment of the present invention.

FIG. 2 is a flowchart illustrating a method for inserting an advertising message into an e-mail message, wherein the e-mail message is transferred through a unified messaging solution, in accordance with an embodiment of the present invention. At step 202, a voice mail message is received. The voice mail message is received by system 104 from the sending user. At step 204, an advertising message is associated with the voice mail message. The advertising message is associated by advertising server 108 on the basis of the content of the voice mail message. Details regarding the association of the advertising message are provided with reference to FIGS. 3 and 4. At step 206, the advertising message is inserted into an e-mail message to which the voice mail message is attached. At step 208, the e-mail message is transmitted. The e-mail message, along with the advertising message and attached voice mail message, is transmitted to the receiving user.

Figure 3:
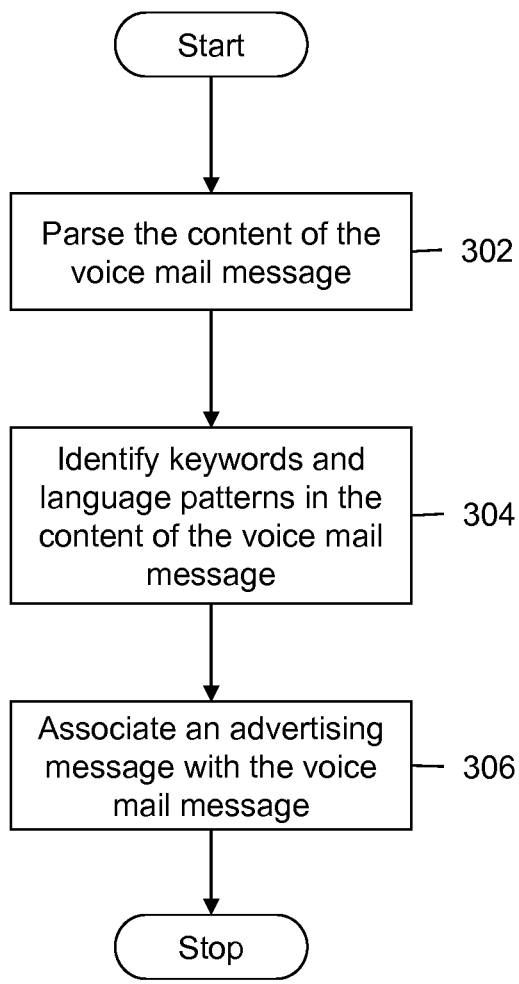
FIG. 3 is a flowchart illustrating a method for associating an advertising message to be inserted into an e-mail message, in accordance with an embodiment of the present invention.

FIG. 3 is a flowchart illustrating a method for associating an advertising message to be inserted into an e-mail message, in accordance with an embodiment of the present invention. Permission is sought from user 102 of the unified messaging solution, for associating the advertising message to the e-mail message to which the voice mail message is attached. In accordance with an embodiment of the present invention, user 102 is the sending user. In accordance with another embodiment of the present invention, user 102 is the receiving user. In accordance with an embodiment of the present invention, a company hosting the unified messaging solutions seeks permission when user 102 registers with the company. If user 102 grants permission then, at step 302, the content of the voice mail message is parsed. The content of the voice mail message is parsed by speech-recognition system 106. In accordance with an embodiment of the present invention, speech-recognition system 106 is a large vocabulary speaker independent speech-recognition system. At step 304, speech-recognition system 106 identifies keywords and language patterns in the content of the voice mail message. Next, speech-recognition system 106 sends the identified keywords and language patterns to advertising server 108. At step 306, an advertising message is associated with the voice mail message. The advertising message is associated by advertising server 108 on the basis of the identified keywords and the language patterns.

Figure 4:
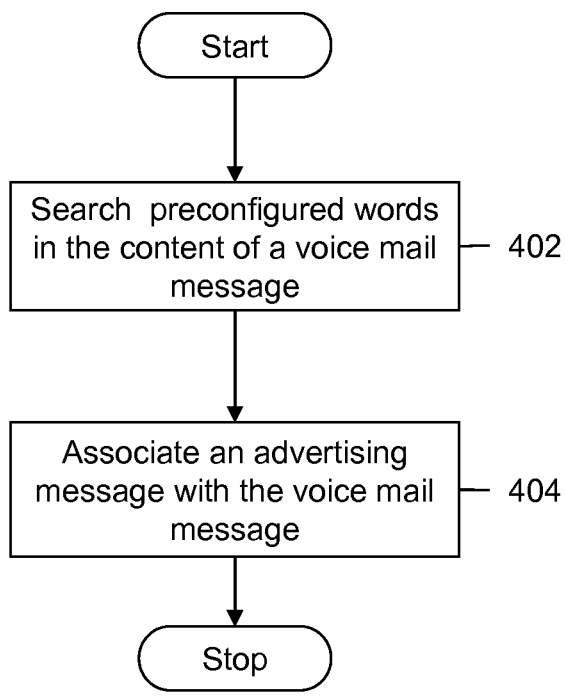
FIG. 4 is a flowchart illustrating a method for associating an advertising message to be inserted into an e-mail message, in accordance with an embodiment of the present invention.

FIG. 4 is a flowchart illustrating a method for associating an advertising message to be inserted into an e-mail message, in accordance with an embodiment of the present invention. At step 402, preconfigured words are searched in the content of the voice mail message. The preconfigured words are searched by advertising server 108. The preconfigured words are searched at the point of time at which the sending user is leaving the voice mail message. In accordance with an embodiment of the present invention, the preconfigured words are searched after the voicemail message has been completely received by system 104. The preconfigured words are predefined words. Advertising server 108 checks whether any preconfigured word is present in the content of the voice mail message. At step 404, the advertising message is associated with the voice mail message. The advertising message is associated by advertising server 108 on the basis of the preconfigured words present in the content of the voice mail message. In accordance with an embodiment of the present invention, the content of the advertisement message is tailored online to fit the length of the voicemail message.

In accordance with an embodiment of the present invention, advertising server 108 reports a success rate of the correlation between the preconfigured words and the content of the voice mail message. The success rate is defined as a ratio of the number of preconfigured words present in the content of the voice mail message and the total number of these preconfigured words. The success rate of the correlation is then used to select an advertisement message to be associated with the voicemail message.

Figure 5:
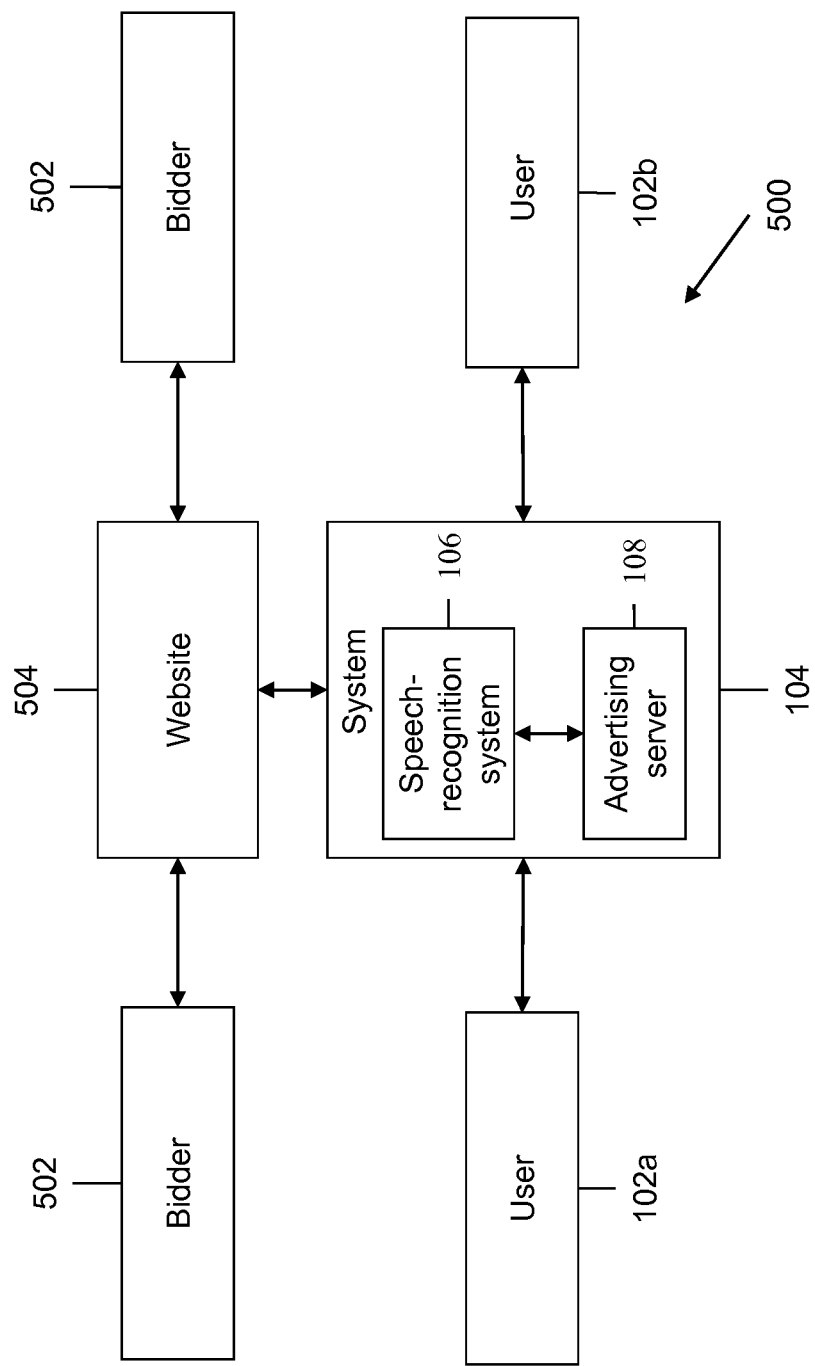
FIG. 5 illustrates an environment for facilitating bidding, in accordance with an embodiment of the present invention.

In accordance with an embodiment of the present invention, a dynamic bidding is used for associating advertising messages to be inserted into the e-mail message. FIG. 5 illustrates an environment 500 for facilitating bidding, in accordance with an embodiment of the present invention. Environment 500 includes plurality of users 102, system 104, plurality of bidders 502 and website 504. In accordance with an embodiment of the present invention, a plurality of voice mail messages are received by system 104 from one or more users from plurality of users 102. As described earlier, speech-recognition system 106 identifies certain keywords and language patterns in the content of the received voice mail messages and sends the keywords and language patterns identified for each received voice mail message to advertising server 108. Based on the identified keywords and language patterns, advertising server 108 groups the received voice mail messages. The received voice mail messages are so grouped that a group includes those voice mail messages whose content contain a common keyword. Accordingly, each received voice mail message is grouped in one or more groups. Next, advertising server 108 posts the count of the voice mail messages in each group along with the keyword corresponding to that group.

In accordance with an embodiment of the present invention, the count of the voice mail messages in each group along with the keyword corresponding to that group is posted on website 504 for a predefined bidding time. Bidders 502 access website 504 for the posted information. Bidders 502 then compete by bidding for display space in the e-mail messages to which the received voice mail messages are attached. Display space is the space provided in an e-mail message for an advertising message. In accordance with an embodiment of the present invention, the e-mail message includes more than one advertising message. While deciding the bid, bidders 502 can consider the information posted on website 504. For example, an automobile company will be interested in having its advertisement inserted into e-mail messages that have voice mail messages in the group corresponding to the keywords 'car', 'vacation', 'trip', etc. Further, the company is likely to bid a higher amount for winning display space in the e-mail messages if a large number of voice mail messages include the keywords 'car', 'vacation', 'trip', etc.

Accordingly, each interested bidder 502 will place a bid for obtaining display space in the e-mail messages. Advertising server 108 receives these bids. On the basis of the received bids, advertising server 108 associates the advertising messages of bidders 502. In accordance with an embodiment of the present invention, while associating the advertising messages, advertising server 108 associates the advertisement message from the highest bidder with the voicemail messages. The advertising server 108 may tailor the advertisement message from the higher bidder to fit the length of the voicemail messages. Further, advertising server 108 allocates display space in the e-mail messages to the associated advertising messages. Advertising Server 108 inserts the associated advertising messages into the allocated display space. Thereafter, advertising server 108 transmits the e-mail messages to the corresponding recipients of the voice mail messages.

In accordance with an embodiment of the present invention, bidders 502 post the keywords and phrases which are of interest to them on the website 504. These phrases and keywords are then submitted to system 104 as a solicitation for getting the information regarding the voicemail messages, which contain these keywords and phrases.

Figure 6:
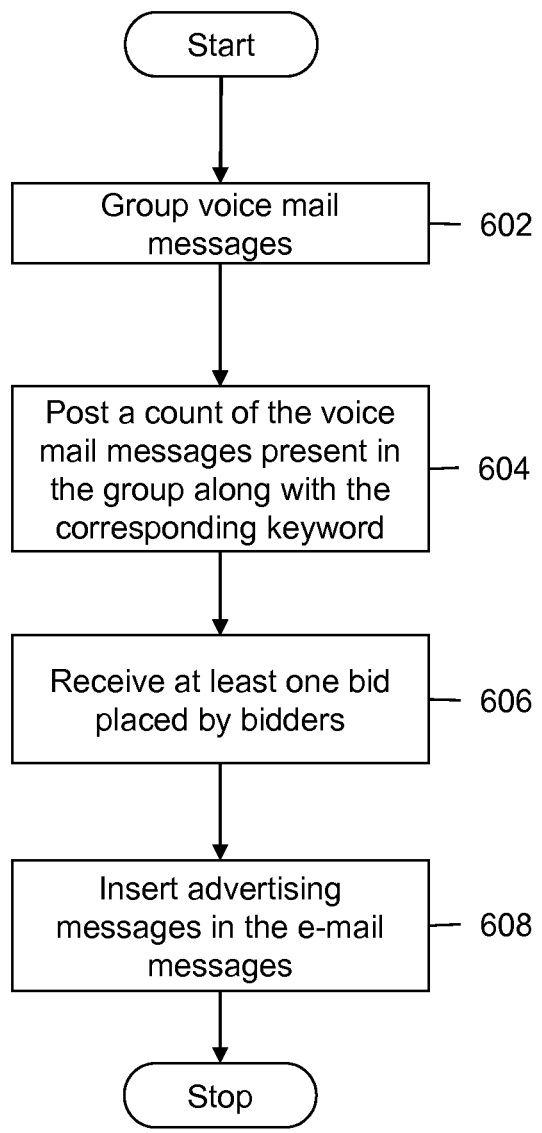
FIG. 6 is a flowchart illustrating bidding for obtaining display space in a plurality of e-mail messages, in accordance with an embodiment of the present invention.

FIG. 6 is a flowchart illustrating bidding for obtaining display space in a plurality of e-mail messages, in accordance with an embodiment of the present invention. Voice mail messages are attached to the e-mail messages. At step 602, the voice mail messages are grouped. The voice mail messages are grouped by advertising server 108 on the basis of keywords and language patterns that are found in the content of the voice mail messages. The grouping is so organized that a group includes those voice mail messages whose content includes a common keyword. For example, 1000 voice mail messages whose content includes the keyword 'car'. Therefore, these 1000 voice mail messages including the keyword 'car' are in a group that corresponds to the keyword 'car'. Moreover, these 1000 voice mail messages can be present in more than one group. At step 604, advertising server 108 posts the count of voice mail messages in each group along with the keyword corresponding to the group. For example, advertising server 108 posts that there are 1000 voice mail messages in the group corresponding to the keyword 'car'. In accordance with an embodiment of the present invention, the count of voice mail messages in each group along with the keyword corresponding to the group is posted on website 504.

During the predefined bidding time, plurality of bidders 502 compete among each other for obtaining display space in the e-mail messages to which the voice mail messages are attached. Using the information posted on website 504, plurality of bidders 502 place at least one bid for obtaining display space in the e-mail messages. At step 606, the at least one bid that is placed by plurality of bidders 502 is received. The at least one bid is received by advertising server 108, which analyses the at least one bid placed by plurality of bidders 502. At step 608, advertising messages are inserted into the e-mail messages. The advertising messages are inserted into the e-mail messages by advertising server 108 on the basis of the at least one bid that is placed by plurality of bidders 502.

According to various embodiments of the invention, a method for inserting an included message into an e-mail message, wherein the e-mail message is transferred through a unified messaging solution is provided. The method comprises receiving a voice mail message; associating the included message with the voice mail message; inserting the included message into the e-mail message, wherein the voice mail message is attached to the e-mail message; and transmitting the e-mail message along with the included message and the attached voice mail message.

In another embodiment of the invention, a method for inserting an included message into an e-mail message, wherein the e-mail message is transferred through a unified messaging solution is provided. The method comprises receiving a plurality of voice mail messages; parsing the content of the received voice mail messages; identifying keywords in the content of the received voice mail messages on the basis of the parsing; grouping the received voice mail messages on the basis of the identified keywords in the content of the received voice mail messages, wherein the content of the voice mail messages present in a group include a common keyword; posting a count of the voice mail messages present in each group along with the corresponding common keyword that is present in the content of the voice mail messages in that group, wherein the count and the common keyword of each group is posted on a website for a predefined bidding time; receiving at least one bid for display space in each e-mail message from the plurality of e-mail messages, wherein each e-mail message comprises a voice mail message from the received voice mail messages attached to the corresponding e-mail messages; inserting at least one included message into each e-mail message from the plurality of e-mail messages based on the received at least one bid; and transmitting the e-mail messages along with the at least one included message and attached voice mail messages.

In another embodiment of the invention, a system for inserting an included message into an e-mail message, wherein the e-mail message is transferred through a unified messaging solution is provided. The system comprises a speech-recognition system, wherein the speech-recognition system is adapted to identify keywords and language patterns in content of a voice mail message; and an advertising server adapted to associate and insert the included message into the e-mail message based on the identified keywords in the content of the voice mail message, wherein the voice mail message is attached to the e-mail message.

Various embodiments of the invention provide a machine-readable medium that includes instructions executable by a computer processor. One or more of these instructions receive a voice mail message. Other instructions associate the included message with the voice mail message. Other instructions insert the included message into the e-mail message, wherein the voice mail message is attached to the e-mail message. Still other instructions transmit the e-mail message along with the included message and the attached voice mail message.

Various embodiments of the present invention facilitate a company hosting a unified messaging solution to offer a wider spectrum of price points to its users. For example, a company can offer a financial incentive to a user who grants permission to the company for inserting an advertising message into an e-mail message sent or received by the user.

Various embodiments of the present invention provide a new business method for associating and inserting an advertising message into a voice mail message. The advertising message may be an image, a text message or a video clip.

While associating the advertising message, various companies bid for display space in an e-mail message by using dynamic bidding. Dynamic bidding allows companies to select the voice mail message of their choice. The companies can also decide the amount to be placed on bids for the voice mail message.

Although the invention has been discussed with respect to specific embodiments thereof, these embodiments are merely illustrative, and not restrictive, of the invention. For example, although the included message has been described with respect to advertising message, other types of message may be included such as informational, educational, requested, and other useful or desirable message can comprise the included message.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claim.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. Distributed, or networked systems, components and circuits can be used. Communication, or transfer, of data may be wired, wireless, or by any other means.

A "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

Any suitable programming language can be used to implement the routines of the present invention including C, C++, Java, assembly language, Extensible Markup Language (XML), VXML, scripting languages, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as operating system, kernel, etc. The routines can operate in an operating system environment or as stand-alone routines occupying all, or a substantial part, of the system processing.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

What is claimed is:

1. A method comprising:
   receiving a voicemail message;
   identifying at least one of a plurality of preconfigured keywords included in a content of the voicemail message;
   responsive to the identifying, determining a secondary message for associating with the voicemail message based on the at least one of a plurality of preconfigured keywords that is identified as included in the content of the voicemail message;
   generating an e-mail message that includes the voicemail message and the secondary message; and
   transmitting the e-mail message to a receiving device.

2. The method of claim 1, wherein the secondary message is associated with the e-mail message using at least one of an e-mail attachment and hyperlinked information.

3. The method of claim 1, wherein the secondary message is an advertising message.

4. The method of claim 3, wherein the identifying comprises using a speech recognition system for the identifying, wherein the speech recognition system is associated with an advertising server configured for determining the advertising message.

5. The method of claim 4, wherein the speech recognition system comprises at least one technology selected from a group including Voice Extensible Markup Language (VXML), Natural Speech Recognition and Adaptive Speech Recognition (ASR).

6. A method comprising:
   receiving a plurality of voicemail messages;
   identifying at least one of preconfigured keywords and language patterns included in content of the plurality of voicemail messages;
   based on the identifying, grouping the plurality of voicemail messages into groups, wherein voicemail messages in a group include a common keyword;
   advertising on a website a count of the voicemail messages in each group along with the common keyword corresponding to each group;
   receiving a plurality of bids for obtaining a display space in a plurality of e-mail messages associated with a group, wherein each of the plurality of e-mail messages includes at least one of the voicemail messages of the group, and wherein display space includes space provided in an e-mail message for a secondary message;
   determining a highest bid in the plurality of bids;
   based on the determining, inserting, in each of the plurality of e-mail messages, a secondary message associated with the highest bid; and
   transmitting each of the plurality of e-mail messages including at least one of the voicemail messages of the group and the secondary message, to a recipient of the respective voicemail message.

7. The method of claim 6, wherein the secondary message is associated with the e-mail message using at least one of an email attachment and hyperlinked information.

8. The method of claim 6, wherein the secondary message is an advertising message.

9. The method of claim 8, wherein the identifying comprises using a speech recognition system for the identifying, wherein the speech recognition system is associated with an advertising server configured for determining the advertising message.

10. The method of claim 9, wherein the speech recognition system comprises at least one technology selected from a group including Voice Extensible Markup Language (VXML), Natural Speech Recognition and Adaptive Speech Recognition (ASR).

11. The method of claim 6, wherein an e-mail message includes a plurality of secondary messages.

12. The method of claim 6, wherein the inserting comprises:
   for each of the plurality of e-mail messages, modifying a content of the secondary message to fit the display space in the corresponding e-mail message.

13. The method of claim 6, comprising:
   determining on the website a count of the voicemail messages in each group along with the common keyword corresponding to each group; and based on the determining, placing at least one bid for obtaining display space in a plurality of e-mail messages associated with at least one group.

14. The method of claim 13, comprising:
posting on the website keywords and phrases that are of interest to a bidder; and
receiving information associated with voicemail messages that include at least one of the posted keywords and phrases.

15. A computer program product, embodied in a computer-readable non-transitory medium including instructions executable by a processor and operable to cause the processor to perform functions comprising:
receiving a plurality of voicemail messages;
identifying at least one of preconfigured keywords and language patterns included in content of the plurality of voicemail messages;
based on the identifying, grouping the plurality of voicemail messages into groups, wherein voicemail messages in a group include a common keyword;
advertising on a website a count of the voicemail messages in each group along with the common keyword corresponding to each group;
receiving a plurality of bids for obtaining a display space in a plurality of e-mail messages associated with a group, wherein each of the plurality of e-mail messages includes at least one of the voicemail messages of the group, and wherein display space includes space provided in an e-mail message for a secondary message;
determining a highest bid in the plurality of bids;
based on the determining, inserting, in each of the plurality of e-mail messages, a secondary message associated with the highest bid; and
transmitting each of the plurality of e-mail messages including at least one of the voicemail messages of the group and the secondary message, to a recipient of the respective voicemail message.

16. The computer program product of claim 15, wherein the secondary message is associated with the e-mail message using at least one of an email attachment and hyperlinked information.

17. The computer program product of claim 15, wherein the secondary message is an advertising message.

18. The computer program product of claim 17, wherein the identifying comprises using a speech recognition system for the identifying, wherein the speech recognition system is associated with an advertising server configured for determining the advertising message.

19. The computer program product of claim 18, wherein the speech recognition system comprises at least one technology selected from a group including Voice Extensible Markup Language (VXML), Natural Speech Recognition and Adaptive Speech Recognition (ASR).

20. The computer program product of claim 15, wherein an e-mail message includes a plurality of secondary messages.

21. The computer program product of claim 15, wherein the inserting comprises:
for each of the plurality of e-mail messages, modifying a content of the secondary message to fit the display space in the corresponding e-mail message.

22. The computer program product of claim 15, comprising:
determining on the website a count of the voicemail messages in each group along with the common keyword corresponding to each group; and
based on the determining, placing at least one bid for obtaining display space in a plurality of e-mail messages associated with at least one group.

23. The computer program product of claim 22, comprising:
posting on the website keywords and phrases that are of interest to a bidder; and
receiving information associated with voicemail messages that include at least one of the posted keywords and phrases.

* * * * *